(12) United States Patent
Sidla et al.

(10) Patent No.: US 8,627,923 B2
(45) Date of Patent: Jan. 14, 2014

(54) TANK LIFELINE SYSTEM

(75) Inventors: James G. Sidla, Monticello, MN (US); Sam Linhoff, Osseo, MN (US)

(73) Assignee: Garlock Safety Systems Inc., Minneapolis, MN (US)

( * ) Notice: Subject to any disclaimer, the term of this patent is extended or adjusted under 35 U.S.C. 154(b) by 72 days.

(21) Appl. No.: 13/004,197

(22) Filed: Jan. 11, 2011

(65) Prior Publication Data

US 2011/0174575 A1 Jul. 21, 2011

Related U.S. Application Data (60) Provisional application No. 61/295,231, filed on Jan. 15, 2010.

(51) Int. Cl.
*E04G 5/04* (2006.01)

(52) U.S. Cl.
USPC ............ 182/3; 182/45; 248/226.11; 403/256; 403/257

(58) Field of Classification Search
USPC ............. 182/3, 45; 248/226.11, 228.1, 227.2, 248/227.4; 403/256, 257
See application file for complete search history.

(56) References Cited

U.S. PATENT DOCUMENTS

| | | | |
|---|---|---|---|
| 742,279 A | 10/1903 | Bearse | 52/162 |
| 1,676,197 A | 7/1928 | Marrinan | 52/156 |
| 1,982,963 A | 12/1934 | Post | 52/162 |
| 2,707,585 A | 5/1955 | Hoey | |
| 3,003,579 A | 10/1961 | Weiss | |
| 3,747,552 A | 7/1973 | Rhodes | 114/295 |
| 3,759,346 A | 9/1973 | Brda | 182/7 |
| 3,880,405 A * | 4/1975 | Brueske | 256/59 |
| 4,144,843 A | 3/1979 | Schrougham | 119/786 |
| 4,174,021 A | 11/1979 | Barlock | 182/17 |
| 4,213,624 A | 7/1980 | Sanders | 280/43.12 |
| 4,274,507 A | 6/1981 | Williams | 182/12 |
| 4,315,387 A | 2/1982 | Lee et al. | 52/156 |
| 4,334,662 A * | 6/1982 | Davis et al. | 248/237 |
| 4,440,261 A | 4/1984 | Clark | 182/3 |
| 4,458,617 A | 7/1984 | Eden | 114/39.16 |
| 4,496,027 A | 1/1985 | Fisher | 182/142 |
| 4,512,438 A | 4/1985 | Vilcheck et al. | 182/43 |
| 4,607,724 A | 8/1986 | Hillberg | 182/3 |
| 4,703,831 A | 11/1987 | Forrest et al. | 182/3 |
| 4,799,840 A | 1/1989 | Van Gompel et al. | 410/42 |

(Continued)

FOREIGN PATENT DOCUMENTS

WO WO2004/103473 A1 12/2004

*Primary Examiner* — Katherine Mitchell
*Assistant Examiner* — Daniel Cahn
(74) *Attorney, Agent, or Firm* — Alan Kamrath; Kamrath IP Lawfirm, P.A.

(57) ABSTRACT

Lifeline systems include a worker harness hooked and slideable along a cable attached to a ratchet mechanism and extending between posts, through stand off pipes, or the like and generally parallel to, but spaced from, sides of a tank. The lifeline system utilizes supports which can be removably attached to the reinforcement rib or the cantilevered edge of the tank. The supports can include fastening rings to connect to braces, stabilizers or the ratchet mechanism. The reinforcement rib is received in an omega shaped channel and sandwiched by a clamp located on the first side and moveable relative to a second side of the channel. The cantilevered edge is received between upper and lower plates extending in openings of C-shaped sides in a spaced, angled relation and is sandwiched by a fastener threadably received in the upper plate.

10 Claims, 8 Drawing Sheets

(56) References Cited

U.S. PATENT DOCUMENTS

| | | | |
|---|---|---|---|
| 4,801,228 A | 1/1989 | Van Gompel | 410/94 |
| 4,817,758 A | 4/1989 | Gilmore | 182/16 |
| 4,838,439 A | 6/1989 | Baziuk | 212/179 |
| 4,928,790 A * | 5/1990 | Franks | 182/3 |
| 5,004,072 A | 4/1991 | Launer | 182/45 |
| 5,065,838 A | 11/1991 | Finley | 182/38 |
| 5,135,078 A | 8/1992 | Bell | 182/142 |
| 5,287,943 A | 2/1994 | Bell | 182/3 |
| 5,328,192 A | 7/1994 | Thompson | 280/47.24 |
| 5,337,856 A | 8/1994 | Fillers | 182/107 |
| 5,370,203 A | 12/1994 | Kiska | 182/111 |
| 5,476,282 A | 12/1995 | Dahl | 280/651 |
| 5,603,488 A * | 2/1997 | O'Rourke et al. | 254/334 |
| 5,820,143 A | 10/1998 | Rigo | 280/47.19 |
| 5,979,601 A | 11/1999 | Lu | 182/82 |
| 6,019,330 A | 2/2000 | Affrunti | 248/237 |
| 6,227,553 B1 | 5/2001 | Palmer | 280/47.18 |
| 6,401,863 B1 | 6/2002 | Kirkland | 182/142 |
| 6,412,230 B1 | 7/2002 | Zambelli et al. | 52/27 |
| 6,695,095 B1 | 2/2004 | Franke | 182/3 |
| 6,718,718 B2 * | 4/2004 | Haddock | 52/545 |
| 6,880,838 B2 | 4/2005 | Hjorth | 280/79.2 |
| 7,032,710 B2 | 4/2006 | Anderson et al. | 182/16 |
| 7,207,414 B2 | 4/2007 | Luke et al. | 182/3 |
| 7,322,553 B2 * | 1/2008 | Rexroad | 248/274.1 |
| 8,240,431 B2 | 8/2012 | Smith | 182/3 |
| 2003/0159882 A1 * | 8/2003 | Franckewich, Jr. | 182/82 |
| 2004/0055818 A1 | 3/2004 | Fulton et al. | 182/3 |
| 2004/0195041 A1 | 10/2004 | Vetesnik | 182/3 |
| 2005/0169735 A1 | 8/2005 | Pelsue | 414/469 |
| 2006/0107605 A1 | 5/2006 | Krahn | 52/155 |
| 2007/0289811 A1 | 12/2007 | Smith | 182/3 |
| 2010/0300017 A1 | 12/2010 | Bulloch | 52/157 |

* cited by examiner

TANK LIFELINE SYSTEM

BACKGROUND

The present invention generally relates to lifeline systems for tanks including supports for removable attachment to reinforcement ribs or cantilevered edges of such tanks.

Numerous flat-top or bi-level frac tanks are utilized in oil pumping fields. Maintenance is required to be performed by workers on top of such tanks. As an example, pumps located under domed enclosures need to be serviced on occasion. Thus, a system for providing fall protection for such workers is needed for such tanks.

SUMMARY

The present invention solves such need and other problems in the field of fall protection devices for tanks by providing, in its most preferred form, a lifeline system for one or more tanks in a tank farm. Generally, the lifeline systems include supports for removable attachment to reinforcement ribs or cantilevered edges of such tanks. A support for removable attachment to a reinforcement rib of a tank includes a channel having a generally omega shape including first and second sides extending from opposite edges of a top and first and second flanges extending in opposite directions from the first and second sides. The first and second sides are spaced and the top is spaced from the first and second flanges to receive the reinforcement rib of the tank. A clamp located on the first side of the channel is moveable relative to the second side of the channel to sandwich the reinforcement rib between the first and second sides. A fastening ring of a generally U-shape includes first and second legs attached to the channel and a portion extending between the first and second legs spaced from the channel.

A support for removable attachment to a cantilevered edge of a tank includes first and second C-shaped sides each having an opening and arranged in a spaced relation at a small acute angle. Upper and lower, parallel plates extend in the openings of the first and second C-shaped sides generally perpendicular to the C-shaped sides, with the upper and lower plates being spaced to slideably receive the cantilevered edge of the tank. A fastener is threadably received in the upper plate and moveable relative to the lower plate to sandwich the cantilevered edge between the upper and lower, parallel plates. A fastening ring is located between the first and second C-shaped sides and secured to the upper plate.

A fastening ring is utilized to connect to other elements of the lifeline system including, but not limited to, braces, stabilizers or ratchet mechanisms. The lifeline system generally includes a worker harness hooked and slideable along a cable attached to a ratchet mechanism and extending between posts, through a stand off pipe, or the like.

The present invention will become clearer in light of the following detailed description of illustrative embodiments described in connection with the drawings.

DESCRIPTION OF THE DRAWINGS

The illustrative embodiments may best be described by reference to the accompanying drawings where.

All figures are drawn for ease of explanation of the basic teachings of the present invention only; the extensions of the figures with respect to number, position, relationship, and dimensions of the parts to form the preferred embodiments will be explained or will be within the skill of the art after the following description has been read and understood. Further, the exact dimensions and dimensional proportions to conform to specific force, weight, strength, and similar requirements will likewise be within the skill of the art after the following description has been read and understood.

Where used in the various figures of the drawings, the same numerals designate the same or similar parts. Furthermore, when the terms "top", "bottom", "first", "second", "front", "back", "height", "width", "length", "end", "side", "horizontal", "vertical", and similar terms are used herein, it should be understood that these terms have reference only to the structure shown in the drawings as it would appear to a person viewing the drawings and are utilized only to facilitate describing the illustrative embodiments.

DESCRIPTION OF THE PREFERRED EMBODIMENTS

Figure 1:
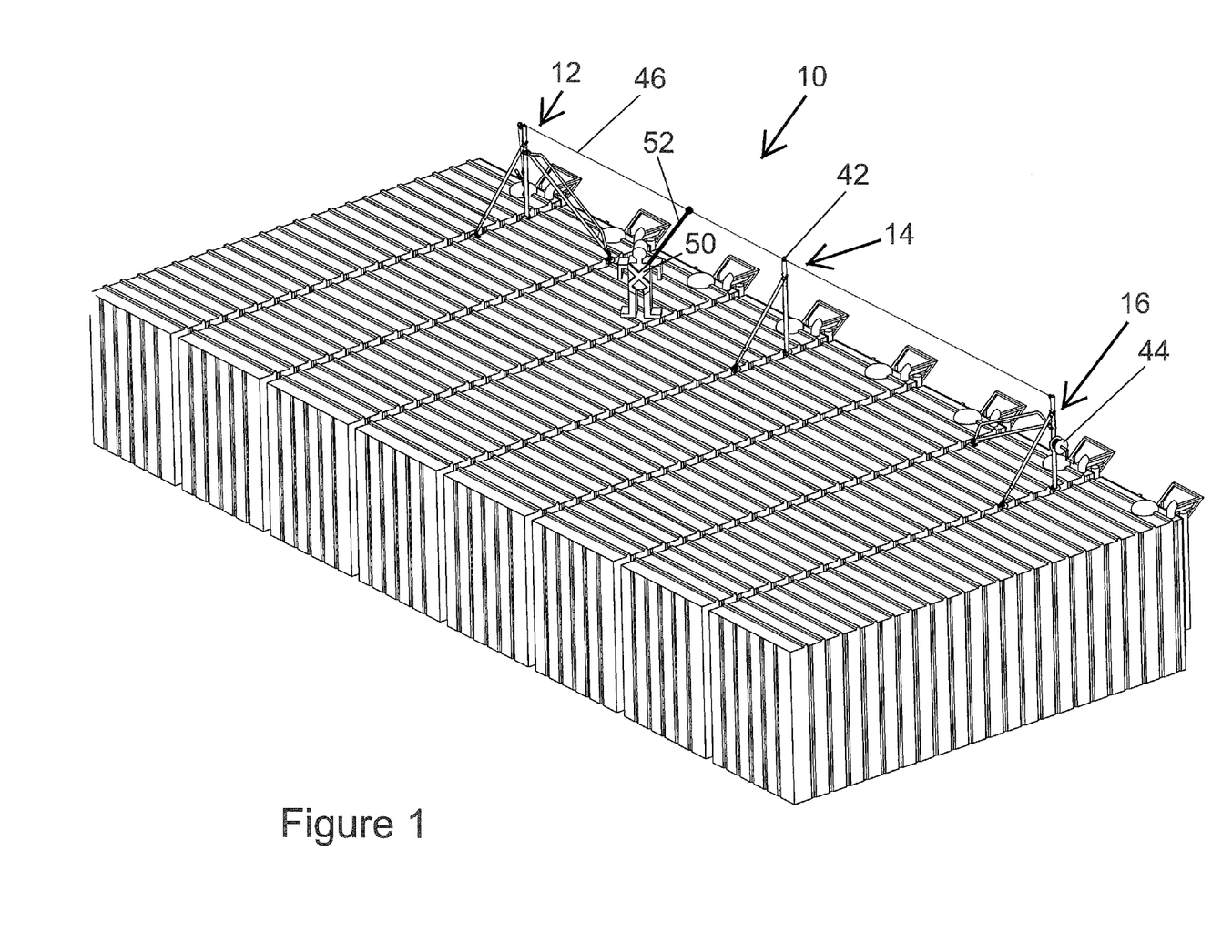
FIG. 1 shows a perspective view of a preferred embodiment of a lifeline system according to the teachings of the present invention.

A lifeline system for a tank farm is generally shown in the drawings and designated 10. Generally, lifeline system 10 includes a primary stanchion 12, one or more intermediate stanchions 14 and a termination stanchion 16. Each stanchion 12, 14 and 16 includes a post 18 having an upper end and a lower end attached to a tank support 20a.

Figure 2:
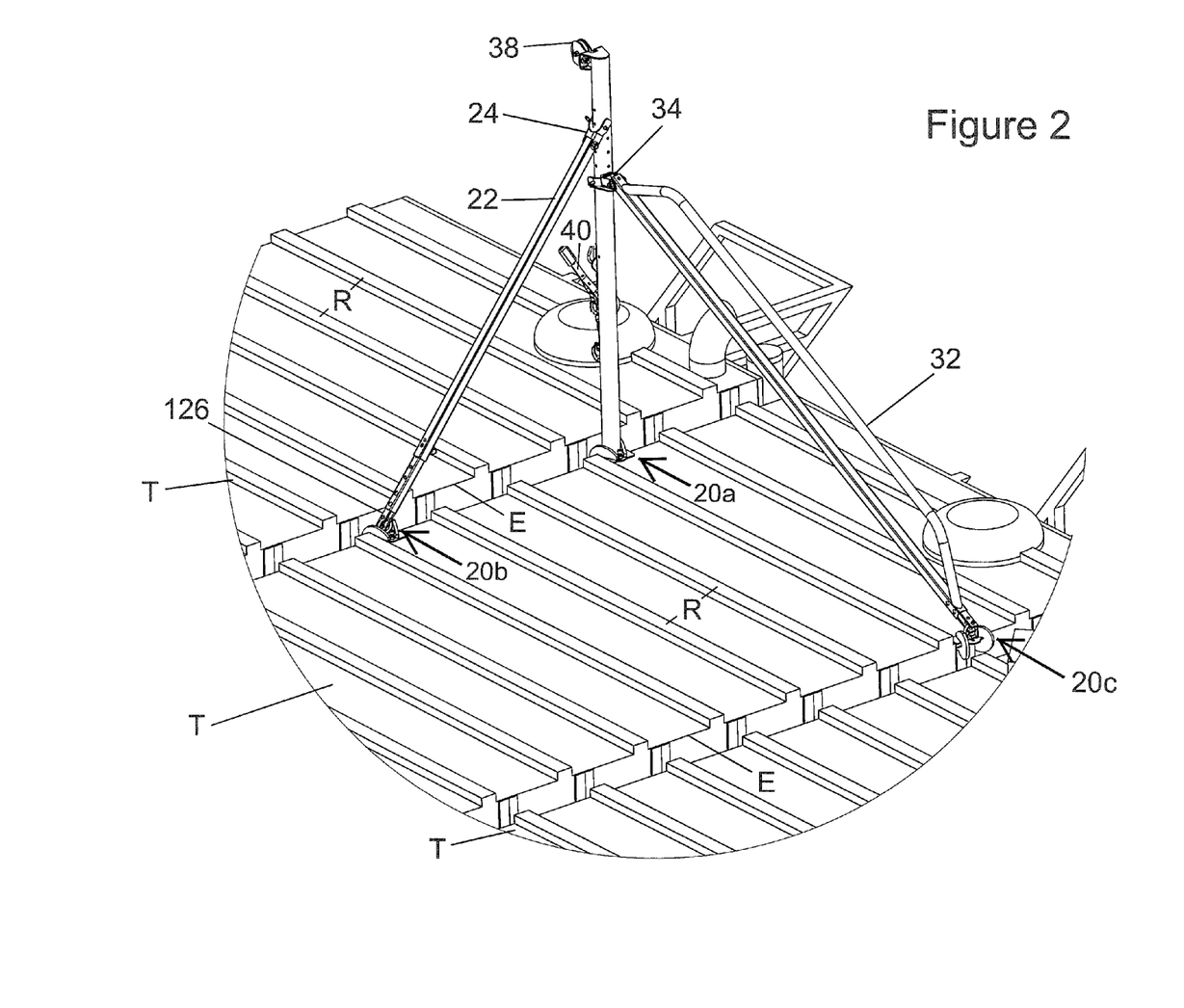
FIG. 2 shows an enlarged perspective view of the primary stanchion of the lifeline system of FIG. 1.

Each stanchion 12, 14 and 16 further includes a brace 22 having a first end pivotally mounted about a brace axis to a collar 24 suitably secured at various positions adjacent to the upper end and vertically spaced from the upper end of post 18. In the preferred form, collar 24 can be secured such by a pin extending through collar 24 and one of a plurality of vertically spaced holes in post 18. The second end of brace 22 is pivotally secured to a tank support 20b. In the form shown, brace 22 is in the form of a single tube. The second end of brace 22 includes a telescoping portion 126 which can be locked in position such as by pins. In alternate embodiments, the second end of brace 22 includes a yoke threadably received therein.

Each primary and termination stanchion 12 and 16 includes a stabilizer 32 having a first end pivotally mounted about a stabilizer axis to a collar 34 suitably secured at various positions adjacent to the upper end and vertically spaced from the upper end of post 18. In the preferred form, collar 34 can be secured such by a pin extending through collar 34 and one of a plurality of vertically spaced holes in post 18. The stabilizer axis is generally perpendicular to the brace axis. Although shown as being separately formed in the preferred form, collars 24 and 34 could be formed as a unitary component according to the teachings of the present invention. The second end of stabilizer 32 is pivotally secured to a tank support 20c. The second end of stabilizer 32 includes a telescoping portion 126 slideably received therein. In the preferred form, stabilizer 32 is in the shape of an isosceles trapezoid including a base extending between the stabilizer axis and tank support 20c, a top spaced from and parallel to the base, and first and second angled ends.

The upper end of post 18 of primary stanchion 12 includes a pulley 38. A ratchet mechanism 40 is suitably attached to post 18 of primary stanchion 12. The upper end of post 18 of each intermediate stanchion 14 includes a loop 42. A cable spool 44 is suitably attached to termination stanchion 16. Cable 46 can be removed from cable spool 44, extended through loops 42 of each intermediate stanchion 14, attached to ratchet mechanism 40 and tied off on termination stanchion 16.

Lifeline system 10 further includes a worker harness 50 to be worn by a worker and a lanyard 52 attached to harness 50 and which can be hooked and slid along cable 46. Harness 50 and lanyard 52 can be of any desired form including conventional forms according to the teachings of the present invention.

Conventionally, tanks T include parallel, spaced, reinforcement ribs R on the top and side walls thereof. Tanks T are generally of two types, where the top wall terminates in the side walls and where the top wall includes a cantilevered edge E extending beyond the side walls. In the most preferred form, the clamping mechanism of supports 20a, 20b, and 20c are of identical construction and are adapted to be removably secured to one or both types of tanks T.

Figure 3:
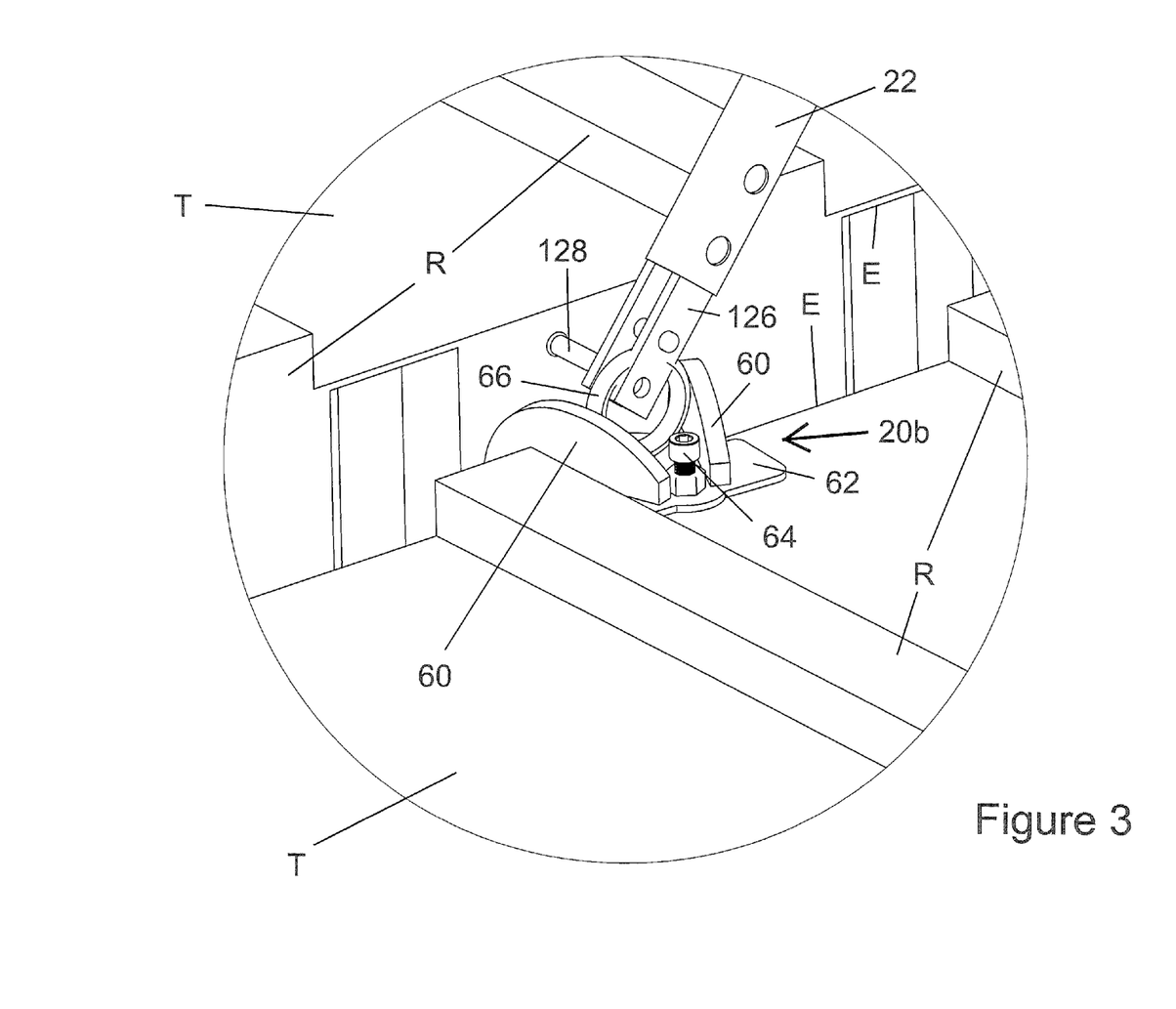
FIG. 3 shows an enlarged perspective view of the tank support of the lifeline system of FIG. 1.
Figure 4:
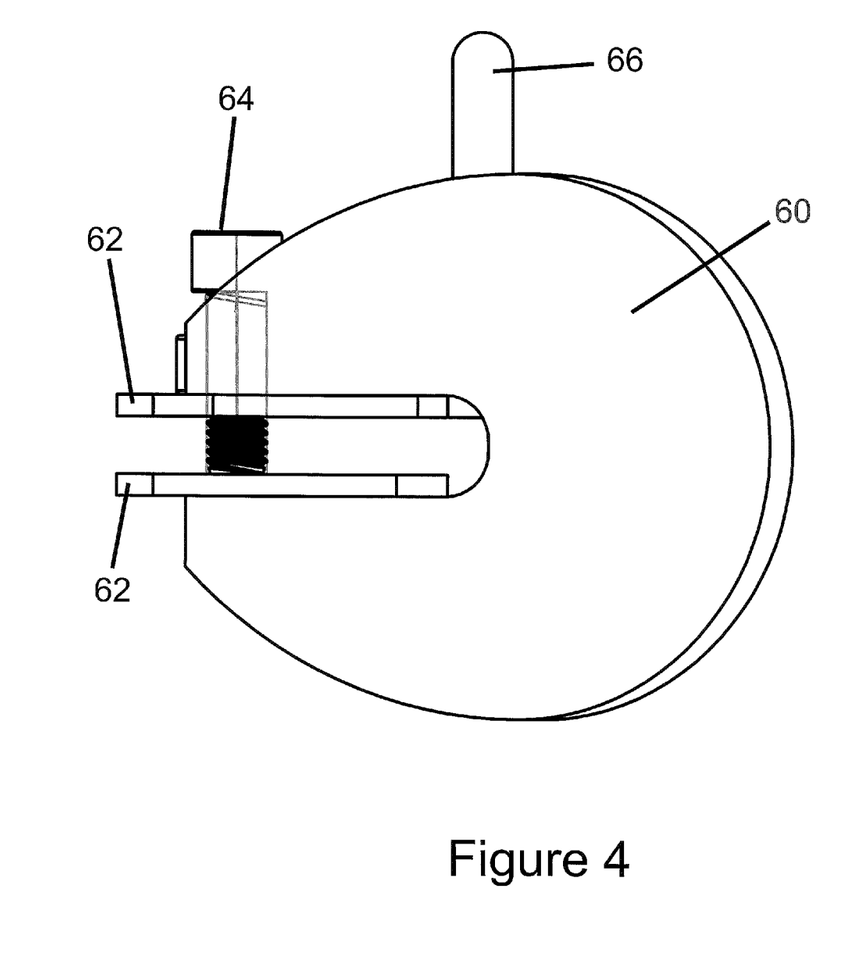
FIG. 4 shows a side view of the tank support of FIG. 3.

In one preferred form, supports 20a, 20b, and 20c include first and second C-shaped sides 60 arranged in a spaced relation at a small acute angle. Upper and lower, spaced, parallel plates 62 extend in the opening of C-shaped sides 60 generally perpendicular to the C-shaped sides 60. Plates 62 are spaced to be slideably received on cantilevered edge E of tank T. A fastener 64 is threadably received in the upper plate 62 and is located generally at the smallest spacing between sides 60. In the preferred form, a mounting aperture is formed in upper plate 62. In use, plates 62 are moved to slideably receive cantilevered edge E, and fastener 64 is threaded to engage with cantilevered edge E and thereby lock plates 62 in place. When used as tank support 20a, post 18 in the preferred form is suitably secured such as by welding to upper plate 62 between sides 60. When used as tank support 20b or 20c, a fastening ring 66 is secured between sides 60 and to upper plate 62 spaced from fastener 64. Telescoping portion 126 of brace 22 or stabilizer 32 can be received on fastening ring 66 and a suitable connector 128 extended through ring 66 and in telescoping portion 126.

Figure 6:
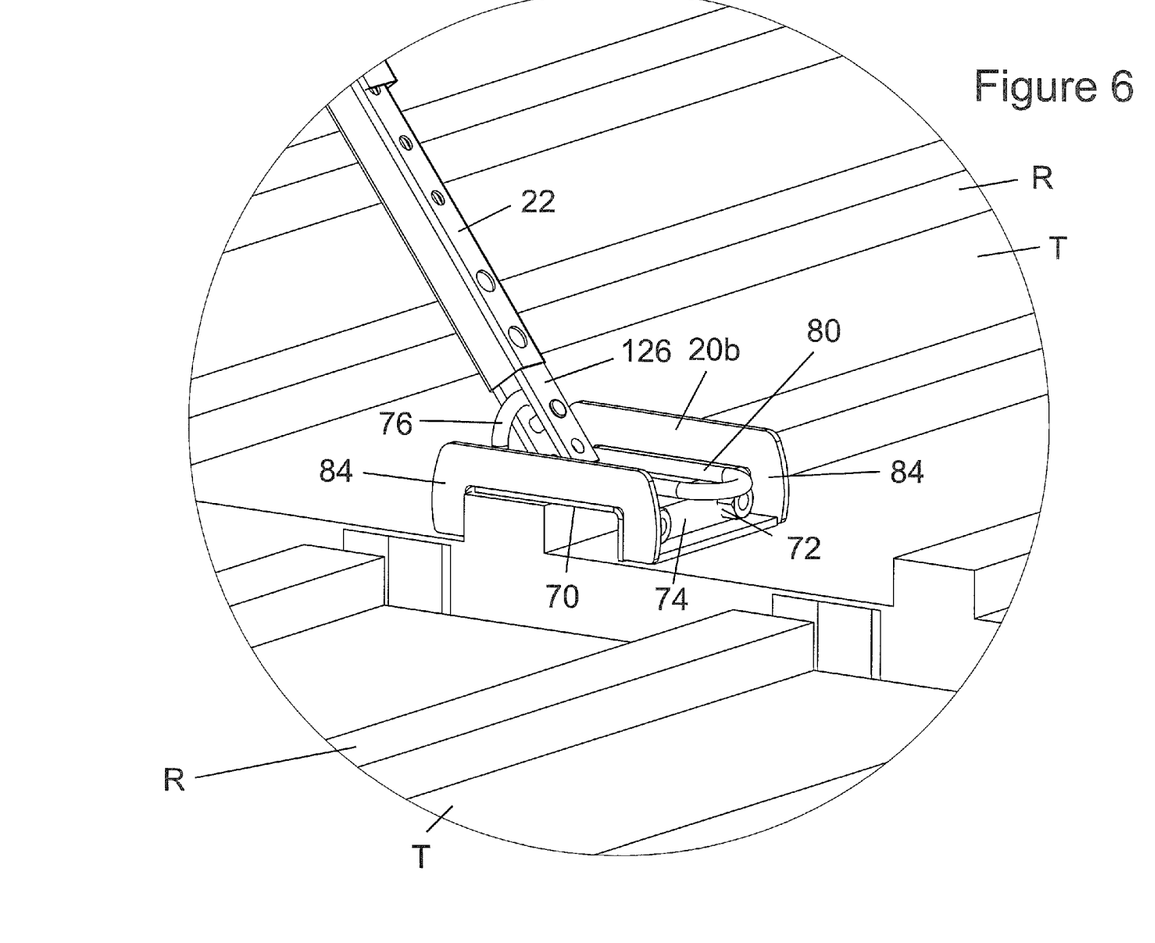
FIG. 6 shows an enlarged perspective view of the tank support of the lifeline system of FIG. 5.
Figure 7:
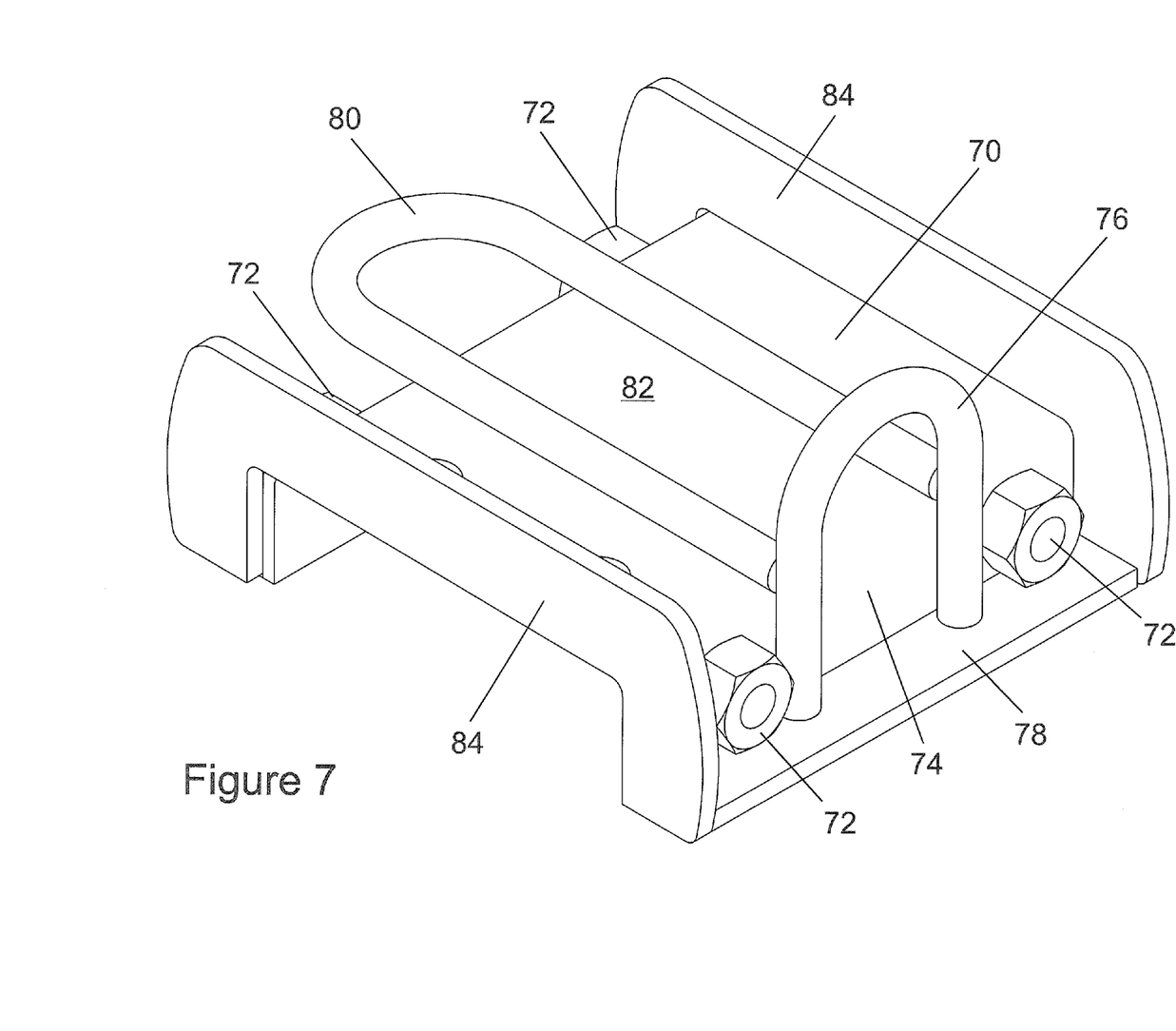
FIG. 7 shows a side view of the tank support of FIG. 6.

In another preferred form, supports 20a, 20b and 20c include a channel 70 of a generally omega shape adapted to be received on reinforcement rib R of the tank T. Suitable provisions for clamping or locking channel 70 on reinforcement rib R are provided such as a pair or two pairs of bolts 72 threadably secured to sides 74 of channel 70. Reinforcement plates 84 can be provided such as secured to the ends of channel 70 and/or intermediate the ends of channel 70. When used as tank support 20a, post 18 in the preferred form is suitably secured such as by welding to top 82 of channel 70. When used as tank support 20b or 20c, a first fastening ring 76 having a U-shape with the ends of its legs attached to a flange 78 of channel 70 and the sides of its legs attached to one of sides 74 of channel 70. In the embodiment shown, a second fastening ring 80 having a U-shape with its ends of its legs attached to the legs of fastening ring 76 and the sides of its legs attached to the top 82 of channel 70. Telescoping portion 126 of brace 22 or stabilizer 32 can be received on fastening ring 76 or 80 and a suitable connector 128 extended through fastening ring 76 or 80 and in telescoping portion 126.

When installed, supports 20a of each of stanchions 12, 14 and 16 are suitably attached to tanks T spaced equidistant from the front edges thereof. Support 20a of stanchion 12 is attached to the first inside tank in a row of tanks T. Support 20b of stanchion 12 is attached along the same edge as support 20a but spaced from the front edge greater than support 20a, with brace 22 extending between support 20b and post 18 of primary stanchion 12. Support 20c of primary stanchion 12 is attached to the first inside tank T opposite to support 20a and equidistant from the front edge as support 20a, with stabilizer 32 extending between support 20c and post 18 of primary stanchion 12.

Stanchions 14 are placed at regular intervals in the row of tank T such as at every third tank T. Supports 20b of stanchions 14 are attached along the same edge as support 20a but spaced from the front edge greater than supports 20a, with brace 22 extending between support 20b and post 18 of each intermediate stanchion 14.

Support 20a of termination stanchion 16 is attached to the second to the last tank T in the row of tanks T. Support 20b of termination stanchion 16 is attached along the same edge as support 20a but spaced from the front edge greater than support 20a, with brace 22 extending between support 20b and post 18 of termination stanchion 16. Support 20c of termination stanchion 16 is attached to the second to the last tank T in the row of tanks T opposite to support 20a and equidistant from the front edge as support 20a, with stabilizer 32 extending between support 20c and post 18 of termination stanchion 16. Stabilizer 32 extends from post 18 of primary stanchion 12 towards termination stanchion 16, and stabilizer 32 extends from post 18 of termination stanchion 16 towards primary stanchion 12. Braces 22 of stanchions 12, 14 and 16 are in a spaced, parallel relation. Supports 20b of stanchions 12, 14 and 16 are spaced equidistant from the front edges of tanks T.

After being tied off on termination stanchion 16, cable 46 can be tensioned between stanchions 12 and 16 utilizing ratchet mechanism 40 generally parallel to, but spaced from, an edge of tank T. After being tensioned, lanyard 52 attached to harness 50 of a worker can be clipped to cable 46. Note the length of lanyard 52 is related to the spacing of supports 20a from the front edge. Thus, a worker is prevented from moving a distance greater than lanyard 52 from the cable 46 and thus reaching the front edge and falling therefrom. Further, workers can move generally parallel to the front edge of tanks T by sliding lanyard 52 along cable 46. It should be appreciated that lanyard 52 can be unclipped from cable 46 on one side of intermediate stanchion 14 and then clipped upon cable 46 on the other side of intermediate stanchion 14 to allow the worker to move along tank T generally the entire length of cable 46.

It should be appreciated that suitable provisions can be taken to prevent workers falling between tanks T in a row of tanks T such as controlling the gaps between adjacent tanks, use of walkway bridges between adjacent tanks T, and the like.

Fall protection is also desired for workers who originally install lifeline system 10 on tanks T as well as for workers initially accessing tanks T and lifeline system 10 according to the teachings of the present invention. According to the teachings of the present invention, supports 20b and 20c can be suitably attached at desired positions to which lanyards attached to workers' harnesses can be temporarily attached.

Figure 5:
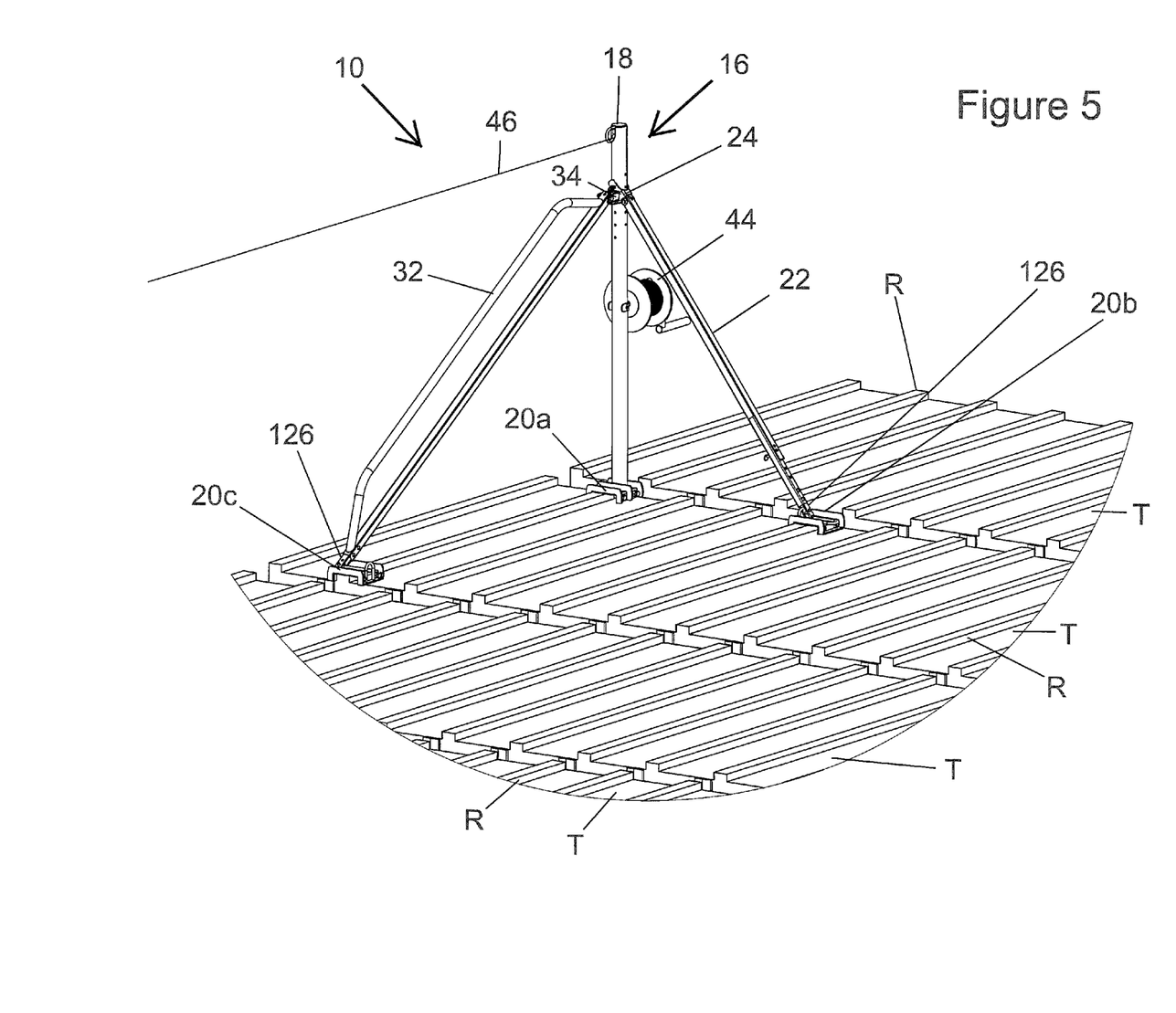
FIG. 5 shows an enlarged perspective view of the termination stanchion of an alternate embodiment of a lifeline system according to the teachings of the present invention.
Figure 8:
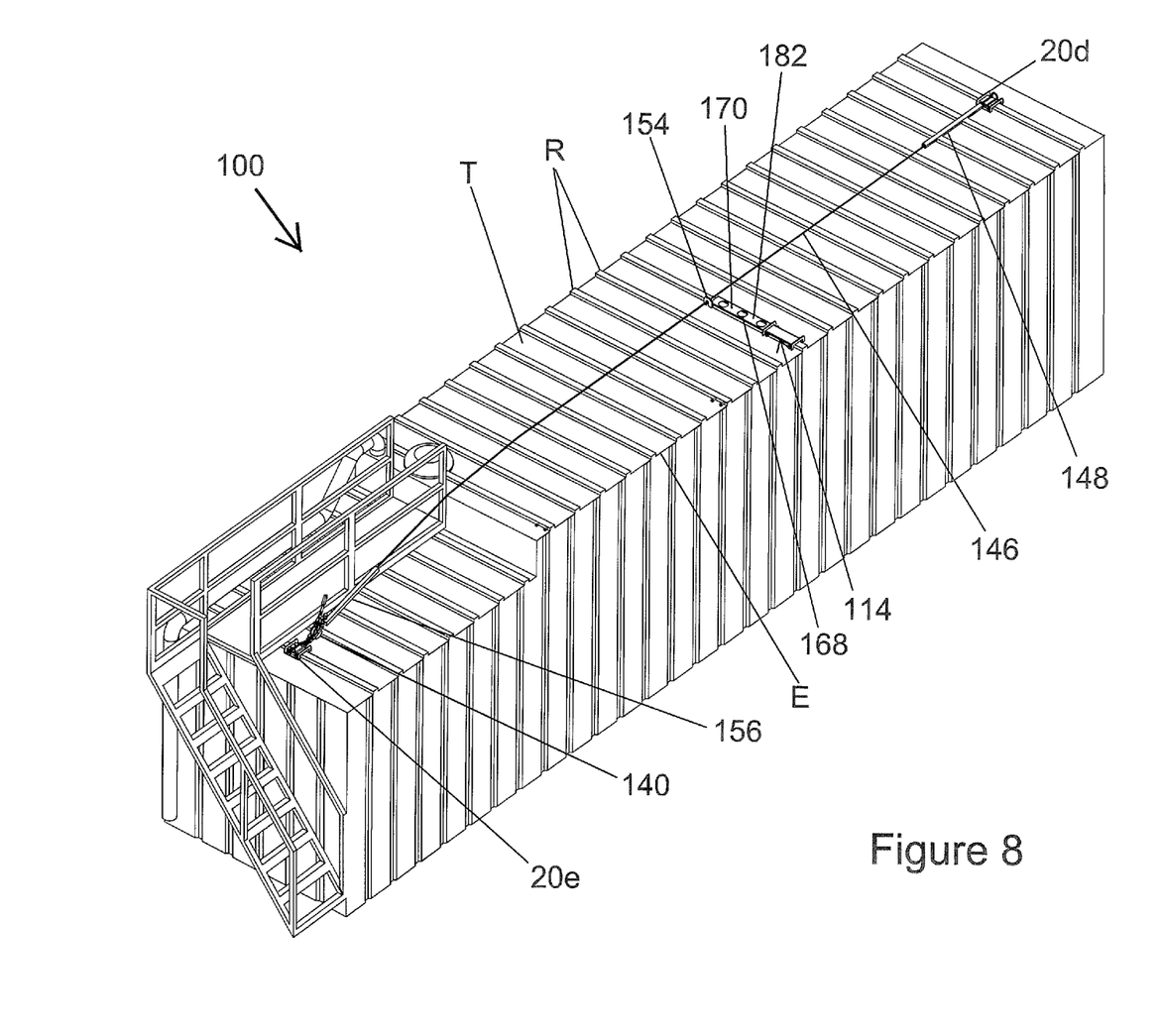
FIG. 8 shows a perspective view of a further embodiment of a lifeline system according to the teachings of the present invention.

An alternate form of a lifeline system for a single tank T according to the preferred teachings is shown in the drawings and generally designated 100. In the form shown, tank supports 20d and 20e are secured to ribs R adjacent to front and back edges of tank T and generally equidistant between the side walls. A cable 146 has a first end clipped to second fastening ring 80 of support 20d and is passed through a first standoff pipe 148 generally abutting with tank support 20d. Cable 146 also passes through an inverted U-shaped clip 154 of one or more intermediate stanchions 114. In the preferred form, clip 154 is attached to a channel extension 170 integrally extending from channel 70 including bolts 72. In the preferred form shown, top 182 of channel extension 170 includes apertures 168 for weight reduction. Cable 146 next passes through a second standoff pipe 156. The second end of cable 146 is attached to a ratchet mechanism 140 in turn clipped to second fastening ring 80 of tank support 20e. Second standoff pipe 156 generally abuts with ratchet mechanism 140.

In use and with cable 146 tensioned by ratchet mechanism 140, the end of lanyard 52 opposite to harness 50 can be clipped to cable 146. Thus, a worker is prevented from moving a distance greater than lanyard 52 from cable 146 and thus reaching the side walls and falling therefrom. Further, standoff pipes 148 and 156 prevent the worker from moving a distance greater than lanyard 52 from the inner ends of standoff pipes 148 and 156 and thus reaching the front and back edges of tank T and falling therefrom. Second standoff pipe 156 can be shorter than first standoff pipe 148 by the length of ratchet mechanism 140 so the worker can be restrained equal distances from the front and back edges of tank T, if desired. It should be appreciated that lanyard 52 can be unclipped from cable 146 on one side of intermediate stanchion 114 and then clipped upon cable 146 on the other side of intermediate stanchion 114 to allow the worker to move along tank T generally the entire length of cable 146.

Although tank supports 20a, 20b, 20c, 20d and 20e have been shown and described for use in lifeline systems 10 and 100 of the preferred forms of the present application, supports 20a, 20b, 20c, 20d and 20e can have application to rail type fall protection systems such as including upstanding holders which slideably receive or are slideably received in tubular posts of rails.

Thus since the invention disclosed herein may be embodied in other specific forms without departing from the spirit or general characteristics thereof, some of which forms have been indicated, the embodiments described herein are to be considered in all respects illustrative and not restrictive. The scope of the invention is to be indicated by the appended claims, rather than by the foregoing description, and all changes which come within the meaning and range of equivalency of the claims are intended to be embraced therein.

The invention claimed is:

1. A support for removable attachment to a reinforcement rib of a tank, the support comprising:
a channel having a generally omega shape including first and second sides extending from opposite edges of a top of the channel, and the channel including first and second flanges extending in opposite directions from the first and second sides respectively, the first and second flanges defining a plane, wherein the first and second sides are spaced to receive the reinforcement rib of the tank, with the top being spaced from and parallel to the plane defined by the first and second flanges to receive the reinforcement rib of the tank; and
a first clamp located on the first side of the channel and moveable relative to the second side of the channel, and a second clamp located on the second side of the channel and movable relative to the first side of the channel; and
a first fastening ring of a generally U-shape including first and second legs secured and extending along one of the first and second sides of the channel, and the first and second legs being secured to an associated flange of said first and second flanges, and a portion of the first fastening ring extending between the first and second legs, wherein the portion of the first fastening ring is spaced from the channel to allow an element to be pivotally attached through the first fastening ring; and
a second fastening ring of a generally U-shape including first and second legs attached to the channel, a portion of the second fastening ring extending between the first and second legs of the second fastening ring, wherein the first and second legs of the second fastening ring is spaced from the channel to allow an element to be attached through the second fastening ring, the first and second legs of the second fastening ring secured along the top of the channel and secured to the first and second legs of the first fastening ring; and
first and second reinforcement plates respectively of a generally U-shape including first and second legs extending from opposite ends of an interconnection portion respectively, the first legs of the first and second reinforcement plates respectively secured to the first side and the first flange of the channel, the second legs of the first and second reinforcement plates respectively secured to the second side and the second flange of the channel, and the interconnection portions of the first and second reinforcement plates respectively secured to the top of the channel and extending outwardly from the channel, with the first and second reinforcement plates being in a spaced and parallel relation to one another, with the first fastening ring located intermediate the first and second reinforcement plates.

2. The support of claim 1 wherein the first clamp comprises a pair of bolts threadably secured to the first side of the channel.

3. The support of claim 1 further comprising:
a ratchet mechanism attached to the second fastening ring;
a cable attached to the ratchet mechanism;
a stand off pipe, with the cable extending through the standoff pipe; and
an intermediate stanchion including a channel extension of an omega shape removably attachable to the reinforcement rib and a U-shaped clip attached to the channel extension, with the cable extending through the U-shaped clip.

4. The support of claim 1 wherein the first and second legs of the first fastening ring are connected and extend parallel to the top of the channel.

5. The support of claim 1 further comprising:
a brace having a first end and a second end, with the second end of the brace pivotally secured to the first fastening ring.

6. The support of claim 5 further comprising:
a U-shaped bridge having first and second extremities spaced from each other, with each of the first and second extremities attached to the brace in a spaced relation intermediate and spaced from the first and second ends, with the brace and the U-shaped bridge having and maintaining an isosceles trapezoid shape.

7. The support of claim 5 further comprising:
a post having an upper end and a lower end;
a first collar located intermediate the upper and lower ends of the post and slideably secured to the post and moveable between the upper and lower ends of the post, with the first end of the brace pivotally attached to the first collar about a brace axis;

a second collar located intermediate the upper and lower ends of the post and slideably secured to the post independent of the first collar and moveable between the upper and lower ends of the post; and a stabilizer having a first end and second end, with the second end of the stabilizer pivotally attached to the second collar about a stabilizer axis perpendicular to the brace axis, with the first end of the stabilizer pivotably connected to another first fastening ring of another channel.

8. The support of claim 7 further comprising:
a ratchet mechanism attached to the post;
a cable attached to the ratchet mechanism; and
a worker harness hooked and slideable along the cable.

9. The support of claim 8 further comprising:
a pulley on the upper end of the post, with the cable extending over the pulley.

10. The support of claim 7 further comprising:
a cable spool attached to the post;
a loop attached to the post; and
a cable extending through the loop and wrapped on the cable spool.

* * * * *